United States Patent
Cho

(10) Patent No.: US 7,050,780 B2
(45) Date of Patent: May 23, 2006

(54) RADIO FREQUENCY TRANCEIVER

(75) Inventor: Jeong-Hyun Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 504 days.

(21) Appl. No.: 10/175,920

(22) Filed: Jun. 21, 2002

(65) Prior Publication Data

US 2002/0197971 A1 Dec. 26, 2002

(30) Foreign Application Priority Data

Jun. 25, 2001 (KR) ................ 2001-36351

(51) Int. Cl.
*H04B 1/16* (2006.01)

(52) U.S. Cl. .................... 455/339; 455/74; 455/83; 455/87

(58) Field of Classification Search .............. 455/76, 455/84, 85, 86, 87, 73, 74, 339, 1; 333/202
See application file for complete search history.

(56) References Cited

U.S. PATENT DOCUMENTS

| | | | | |
|---|---|---|---|---|
| 5,287,539 A | * | 2/1994 | West, Jr. ..................... 455/1 |
| 5,432,779 A | * | 7/1995 | Shimo et al. ............... 455/85 |
| 5,603,097 A | * | 2/1997 | Kanou ........................ 455/86 |
| 5,628,056 A | * | 5/1997 | Grysiewicz et al. ......... 455/74 |
| 5,758,266 A | * | 5/1998 | Kornfeld et al. ............ 455/86 |
| 5,781,849 A | * | 7/1998 | Carlsson et al. ......... 455/114.1 |
| 6,256,511 B1 | * | 7/2001 | Brown et al. ............... 455/84 |
| 6,307,448 B1 | * | 10/2001 | Atokawa et al. ........... 333/202 |
| 6,308,058 B1 | * | 10/2001 | Souetinov et al. ......... 455/323 |
| 6,370,360 B1 | * | 4/2002 | Kunkel ........................ 455/76 |
| 6,397,044 B1 | * | 5/2002 | Nash et al. .................. 455/73 |
| 6,483,399 B1 | * | 11/2002 | Atokawa ..................... 455/78 |
| 6,509,990 B1 | * | 1/2003 | Roberts ...................... 455/339 |
| 2002/0047751 A1 | * | 4/2002 | Ishikawa et al. ........... 333/202 |
| 2002/0070820 A1 | * | 6/2002 | Walker et al. .............. 333/202 |
| 2002/0188957 A1 | * | 12/2002 | Jantzi et al. ................ 725/111 |

* cited by examiner

*Primary Examiner*—Lana Le
(74) *Attorney, Agent, or Firm*—Fleshner & Kim, LLP

(57) ABSTRACT

A RF transceiver for AMPS communication includes: a baseband processor for generating a transmission intermediate frequency signal and processing a reception intermediate frequency signal; a local oscillator for generating a local oscillation signal in transmission and reception; an up-mixer for combining the transmission intermediate frequency signal with the local frequency signal; a duplexer for processing a radio frequency signal received through an antenna; and a specific frequency removing unit installed between the local oscillator and an up-mixer to remove a specific frequency signal generated from the local oscillator. A filter is installed between the local oscillator and the up-mixer to remove the 2-times frequency of the local oscillation signal of 957.66 MHz, thereby removing the self-quieting phenomenon generated in the channel 76 of AMPS.

31 Claims, 2 Drawing Sheets

RADIO FREQUENCY TRANCEIVER

BACKGROUND OF THE INVENTION

1. Field of the Invention

The present invention relates to a radio frequency (RF) transceiver, and more particularly, to a radio frequency (RF) transceiver capable of preventing a self-quieting occurrence in an advanced mobile phone system (AMPS) communication.

2. Description of the Background Art

FIG. 1 is a schematic block diagram showing a currently used super heterodyne RF transceiver.

As shown in FIG. 1, a signal received through an antenna (ANT) passes a duplexer 1 is amplified by a lower noise amplifier (LNA) 2. The amplified signal is converted into a certain intermediated frequency signal (IF) by a down mixer (4) and recovered to a voice signal by a baseband processor 6.

In transmission, the transmission IF signal generated from the baseband processor is converted into a high frequency transmission signal by an up-mixer 8, amplified by a power amplifier module (PAM) 10, and then transmitted through the antenna after passing the duplexer 1.

When the channel 76 is selected as a communication channel in the AMPS, the receiving channel frequency becomes 872.28 MHz such that the received signal is converted into the IF signal of 85.38 MHz by being mixed with an oscillation frequency of 957.66 MHz generated by a local oscillator 11 at the down mixer 4.

The converted IF signal is filtered by the intermediate frequency filter 5 and sent to the baseband processor 6 so as to be processed for recovering the voice signal.

Also, in case of transmission through the channel 76, the transmission IF signal of 130.38 MHz generated from the baseband processor 6 is converted into a high frequency transmission signal of 827.28 MHz by being mixed with the oscillation frequency of 957.66 MHz generated by the local oscillator 11 at the up-mixer 8 so as to be transmitted through the channel 76.

However, in case that the AMPS transceiver communicates through the channel 76, the reception sensitivity becomes frequently degraded due to a self-quieting.

FIG. 2 is an explanatory view for illustrating the self-quieting phenomenon.

As shown in FIG. 2, in the channel 76, the difference between 1915.32 MHz of the second harmonics of the local oscillation frequency (957.66 MHz) and 1043.04 MHz of the eighth harmonics of the transmission intermediate frequency 130.38 MHz is 872.28 MHz identical to the reception frequency of channel 76.

Accordingly, in case that the AMPS transceiver communicates through the channel 76, the AMPS transceiver generates unexpected frequency component jammer) identical to the receiving high frequency, resulting in degradation of receive sensitivity.

SUMMARY OF THE INVENTION

The present invention has been made in an effort to solve the above problem.

It is an object of the present invention to provide an AMPS transceiver capable of preventing self-quieting that occurs in a specific communication channel.

To achieve these and other advantages and in accordance with the purpose of the present invention, as embodied and broadly described herein, there is provided with an RF transceiver including: a baseband processor for generating a transmission intermediate frequency signal and processing a reception intermediate frequency signal; a local oscillator for generating a local oscillation signal in transmission and reception; an up-mixer for combining the transmission intermediate frequency signal with the local frequency signal; a duplexer for processing a radio frequency signal received through an antenna; and a specific frequency removing unit installed between the local oscillator and an up-mixer to remove a specific frequency signal generated from the local oscillator.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A transceiver of the present invention will be described with reference to the accompanying drawings.

In order to prevent occurrence of a self-quieting in the channel 76 communication of the AMPS, the second harmonics of a local oscillation frequency or the eighth harmonics of the transmission IF should be removed. In this respect, since the transmission and reception IF are processed in a single built-in semiconductor chip, only the second harmonics of the local oscillation signal can be substantially handled.

Figure 1:
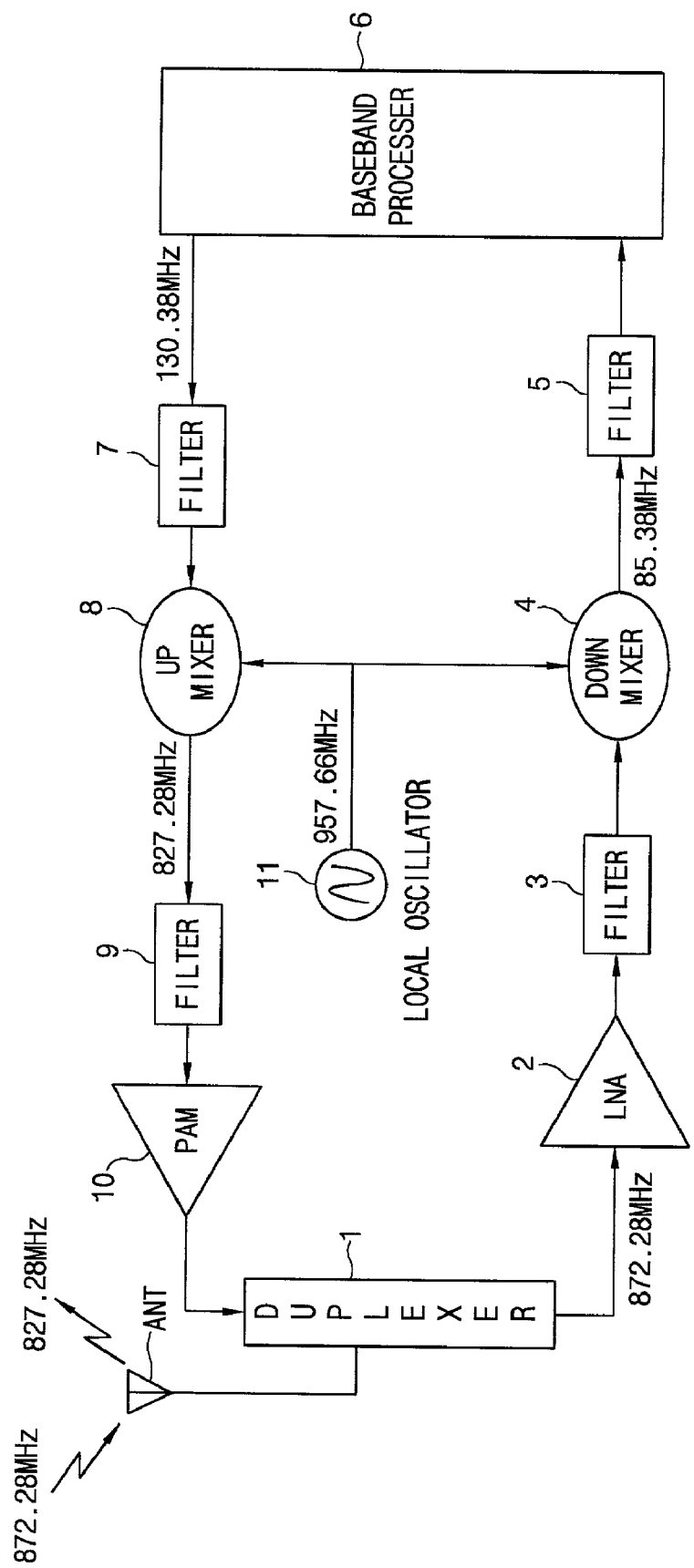
FIG. 1 is a schematic block diagram illustrating a currently used RF transceiver.
Figure 2:
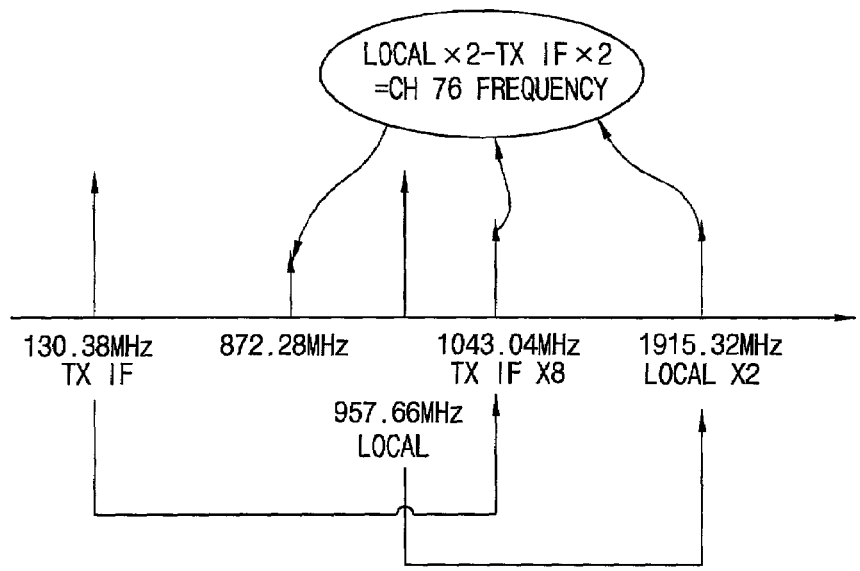
FIG. 2 is a graph for illustrating a self-quieting phenomenon.
Figure 3:
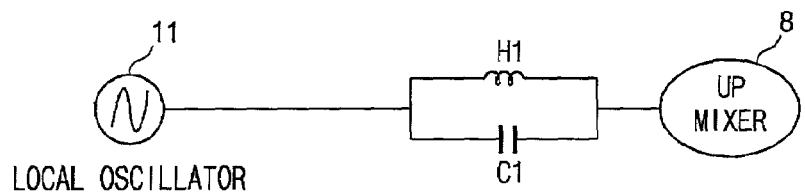
FIG. 3 is a circuit diagram for illustrating a self-quieting prevention means of the transceiver according to a preferred embodiment of the present invention.

FIG. 3 is a circuit diagram for illustrating a self-quieting prevention means of the transceiver adopted to a single band/dual mode transceiver according to preferred embodiment of the prevention.

As shown in FIG. 3, a self-quieting prevention means is installed between a local oscillator 11 and an up-mixer 8 of the transceiver in order to restrain generation of the second harmonics (1915.32 MHz) of the local oscillation frequency (957.66 MHz), which causes the self-quieting.

The self-quieting prevention means is formed with a low-pass filter or a notch filter adoptable to a single band/dual mode transceiver operating in the frequency band of 800 MHz. In the present invention, the notch filter is employed as the self-quieting prevention means.

The notch filter has a 2 pF capacitor C1 and a 3.3 nH inductor H1 arranged in parallel and is installed between the up-mixer 8 and the local oscillator 11 so as to be oscillated near 1.9 GHz.

The values of the capacitor C1 and the inductor H1 can be changed according to arrangement of other parts on the PCB and a buffer can be further inserted between the local oscillator 11 and the up-mixer 8.

With such a structure, the second harmonics of the local oscillation frequency outputted from the local oscillator 11 is removed by the notch filter inserted between the up-mixer 8 and the local oscillator 11.

Figure 4:
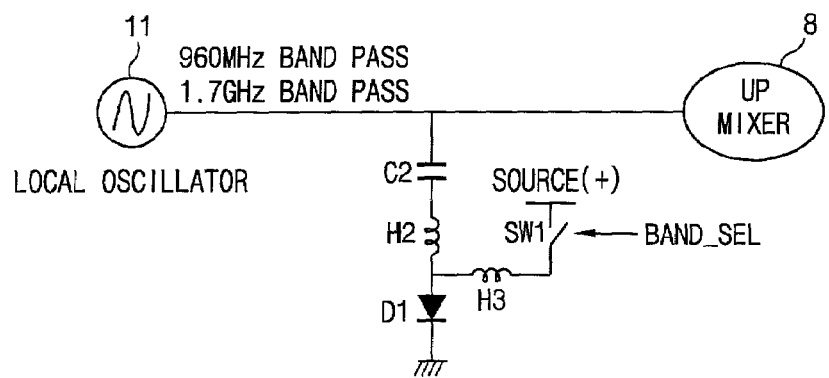
FIG. 4 is a circuit diagram for illustrating a self-quieting prevention means of the transceiver according to another embodiment of the present invention.

FIG. 4 is a circuit diagram for illustrating a self-quieting prevention means of the transceiver adapted to a dual band/dual mode transceiver in accordance with another embodiment of the present invention.

Unlike the single band/dual mode transceiver, the self-quieting prevention means adopted to the dual band/dual mode transceiver does not allow insertion of the notch filter or the low-pass filter between the local oscillator 11 and the up-mixer 8, since the local oscillator 11 generates oscillation signal of 1.7 GHz band for service of 1.9 GHz band and 1.7 GHz is near the frequency of 1915.32 Mhz such that the use of notch filter may affect the 1.7 GHz band frequencies and the low-pass filter blocks the 1.7 GHz band frequencies.

Thus, in such a case, the self-quieting prevention means should not operate in a PCS mode of a 1.9 GHz frequency band and effectively removing the second harmonics of the local oscillation frequency only in the AMPS mode of 800 MHz frequency band.

As shown in FIG. 4, the self-quieting prevention means in accordance with another embodiment of the present invention comprises a resonator constructed by connecting a second capacitor C2 and a second inductor H2 in series and installed between a line connecting the local oscillator 11 and the up-mixer 8 and a ground, a pin diode D1 installed between the resonator and the ground, and an ON/OFF switch SW1 inserted between the pin diode D1 and the power source (+) to selectively supply power to the pin diode D1.

The switch SW1 determines whether the transceiver is in an AMPS mode or a PCS mode on the basis of a band select signal (BAND_SEL) generated from the baseband processor 6, and is turned on in the AMPS mode and turned off in the PCS mode.

When the switch SW1 is turned on in the AMPS mode, power is supplied to the pin diode D1 so that the resonator operates to remove the 1.91 GHz band frequency.

Meanwhile, if the transmission mode is the PCS mode, the switch SW1 is turned off so that the resonator does not operates.

As described above, in the transceiver of the present invention, the self-quieting means installed between the local oscillator and the up-mixer removes the second harmonics of the local oscillation signal of 957.66 MHz, which causes the self-quieting, resulting in preventing the self-quieting in the AMPS channel 76.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An RF transceiver for AMPS communication comprising:
   a baseband processor for generating a transmission intermediate frequency signal and processing a reception intermediate frequency (IF) signal;
   a local oscillator for generating a local oscillation signal in transmission and reception;
   an up-mixer for combining the transmission IF signal with the local frequency signal;
   a duplexer for processing a radio frequency signal received through an antenna; and
   specific frequency removing means installed between the local oscillator and the up-mixer to remove a specific frequency signal generated from the local oscillator,
   wherein the specific frequency removing means comprises a pin diode for removing the specific frequency using a signal generated from the local oscillator a resonator installed between a line connecting the local oscillator and the up-mixer and a ground; a pin diode of which anode is connected to the resonator and a cathode is grounded: and a switch for connecting the anode of the pin diode and a positive terminal of a power source so as to selectively operate the resonator.

2. The RF transceiver of clam 1, wherein the specific frequency removing means further comprised:
   a resonator installed between a line connecting the local oscillator and the up-mixer and a ground;
   a pin diode of which anode is connected to the resonator and a cathode is grounded; and
   a switch for connecting the anode of the pin diode and a positive terminal of a power source so as to selectively operate the resonator.

3. The RF transceiver of claim 1, wherein the transmission and reception IF are respectively 130.38 MHz and 85.38 MHz.

4. The RF transceiver of claim 3, wherein the local oscillation frequency signal is 957.66 MHz.

5. The RF transceiver of claim 4, wherein the specific frequency signal is a second harmonics of the local oscillation frequency.

6. The RF transceiver of claim 1, wherein the local oscillator generates a first and second local oscillation frequency signals of different band.

7. The RF transceiver of claim 6, wherein the first and second local oscillation frequencies are respectively 960 MHz and 1.7 GHz.

8. The RF transceiver of claim 7, wherein the specific frequency removing means comprises:
   a resonator installed between a line connecting the local oscillator and the up-mixer and a ground;
   a pin diode of which anode is connected to the resonator and a cathode is grounded; and
   a switch for connecting the anode of the pin diode and a positive terminal of a power source so as to selectively operate the resonator.

9. The RF transceiver of claim 1, wherein the resonator comprises a first inductor and a capacitor serially connected.

10. The RF transceiver of claim 9, wherein the anode of the diode is connected to the first inductor.

11. The RF transceiver of claim 10, further comprising a second inductor inserted between the switch and the diode.

12. The RF transceiver of claim 11, wherein the switch is switched to an on/off state according to a band select signal generated from the baseband processor.

13. The RF transceiver of claim 12, wherein the switch is turned on if the band select signal indicates an AMPS mode, and turned off if the band select signal indicates a PCS mode.

14. The RF transceiver of claim 12, wherein when the switch is turned on, the resonator is operated so as to remove a signal of a specific frequency generated from the local oscillator.

15. The RF transceiver of claim 14, wherein the specific frequency is a second harmonics of the local oscillation frequency.

16. The RF transceiver of claim 1, wherein the switch includes a pin diode.

17. A RF transceiver for AMPS communication comprising:
- a baseband processor for generating a transmission intermediate frequency (IF) signal and processing a reception intermediate frequency signal;
- a local oscillator for generating a local oscillation signal in transmission and reception;
- an up-mixer for combining the transmission IF signal with the local frequency signal;
- a duplexer for processing a radio frequency signal received through an antenna; and
- a specific frequency removing means installed between the local oscillator and an up-mixer for removing a specific frequency signal generated from the local oscillator,
- wherein the specific frequency removing means is a notch filter or a low-pass filter constructed by serially connecting a first inductor and a first capacitor to remove the specific frequency corresponding to a second harmonics of the local oscillation signal such that a difference between the second harmonics of the local oscillation signal and eighth harmonics of the transmission IF signal is not substantially equal to the radio frequency signal received through the antenna.

18. The RF transceiver of claim 17, wherein the transmission and reception IFs are respectively 130.38 MHz and 85.38 MHz.

19. The RF transceiver of claim 18, wherein the local oscillation frequency is 957.66 MHz.

20. The RF transceiver of claim 19, wherein the first inductor and the first capacitor are respectively 3.3 nH and 2 pF.

21. A self-quieting prevention means of a transceiver comprising:
- a baseband processor for generating a transmission intermediate frequency (IF) signal and processing a reception IF signal;
- a local oscillator for generating first and second local oscillation frequency signals of different bands;
- an up-mixer for combining the transmission IF signal with the local oscillation signal;
- a duplexer for processing a radio frequency signal transmitted and received; and
- a specific frequency removing means installed between the local oscillator and the up-mixer for removing a specific frequency signal generated from the local oscillator,
- wherein the specific frequency removing means comprises:
  - a resonator installed between a line connecting the local oscillator and the up-mixer and a ground;
  - a diode of which anode is connected to the resonator and a cathode is grounded; and
  - a switch for connecting the anode of the pin diode and a positive terminal of a power source so as to selectively operate the resonator.

22. The RF transceiver of claim 21, wherein the first and second local oscillation frequencies are respectively 960 MHz and 1.7 GHz.

23. The RF transceiver of claim 21, wherein the resonator comprises an inductor and capacitor connected in series.

24. The RF transceiver of claim 23, wherein the anode of the diode is connected to the inductor.

25. The RF transceiver of claim 24, wherein the switch is switched to an on/off state according to a band select signal generated from the baseband processor.

26. The RF transceiver of claim 25, wherein the switch is turned on if the band select signal indicates an AMPS mode, and turned off if the band select signal indicates a PCS mode.

27. The RF transceiver of claim 26, wherein the specific frequency band is a second harmonics of the first local oscillation frequency.

28. A transceiver comprising:
- a local oscillator for generating first and second local oscillation frequency signals of different bands;
- a mixer configured to combine a first transmission IF signal with the first local oscillation signal, and a second transmission IF signal with the second local oscillation signal; and
- a harmonics removing circuit including a resonator between the local oscillator and the mixer, a diode having an anode connected to the resonator and a cathode connected to ground, and a switch connected to the anode of the diode, said harmonics removing circuit configured to remove second harmonics of the first local oscillation signal when the switch is switched to a state corresponding to a communication mode using the first local oscillation signal to produce an IF reception signal.

29. The transceiver of claim 28, wherein the resonator comprises an inductor and capacitor connected in series.

30. The transceiver of claim 28, wherein the switch is turned on if the band select signal indicates an AMPS mode, and turned off if the band select signal indicates a PCS mode.

31. The transceiver of claim 28, wherein the second harmonies of the first local oscillation signal is removed such that a difference between the second harmonics of the local oscillation signal and eighth harmonics of the transmission IF signal is not substantially equal to the radio frequency signal received through the antenna.

* * * * *

UNITED STATES PATENT AND TRADEMARK OFFICE
CERTIFICATE OF CORRECTION

| | |
|---|---|
| PATENT NO. | : 7,050,780 B2 |
| APPLICATION NO. | : 10/175920 |
| DATED | : May 23, 2006 |
| INVENTOR(S) | : Jeong-Hyun Cho |

Page 1 of 1

It is certified that error appears in the above-identified patent and that said Letters Patent is hereby corrected as shown below:

(30)   Foreign Application Priority Data

Jun. 22, 2001   (KR)……………………..2001-35810

Signed and Sealed this

Fifteenth Day of August, 2006

JON W. DUDAS
*Director of the United States Patent and Trademark Office*